United States Patent [19]
O'Neil

[11] Patent Number: 5,385,177
[45] Date of Patent: Jan. 31, 1995

[54] AEROSOL CAN RECYCLING SYSTEM

[76] Inventor: Paul J. O'Neil, P.O. Box 4253, Incline Village, Nev. 89450

[21] Appl. No.: 155,486

[22] Filed: Nov. 22, 1993

Related U.S. Application Data

[62] Division of Ser. No. 758,793, Sep. 12, 1991, Pat. No. 5,722,093.

[51] Int. Cl.⁶ .............................................. B65B 3/04
[52] U.S. Cl. ........................................ 141/1; 141/7; 141/51; 141/65; 141/97; 141/329; 141/98; 29/403.1; 29/801; 222/87; 81/3.2; 100/902; 62/149
[58] Field of Search ............. 141/1, 7, 11, 51, 65, 141/66, 93, 82, 98, 97, 329, 330; 29/403.1, 403.3, 426.1, 426.3, 426.4, 426.5, 801; 222/80, 81, 835, 87; 81/3.2, 307; 100/902; 62/60, 149, 529; 422/900

[56] References Cited

U.S. PATENT DOCUMENTS

| | | | |
|---|---|---|---|
| 4,010,623 | 3/1977 | Kaschak | 62/55 |
| 4,166,481 | 9/1979 | Farris et al. | 141/1 |
| 4,349,054 | 9/1982 | Chipman et al. | 141/1 |
| 4,356,681 | 11/1982 | Barnes | 141/82 X |
| 4,407,341 | 10/1983 | Feldt et al. | 141/97 |
| 4,459,906 | 7/1984 | Cound et al. | 100/902 |
| 4,969,495 | 11/1990 | Grant | 141/98 |
| 5,067,327 | 11/1991 | Leblanc | 62/149 X |
| 5,088,526 | 2/1992 | Nash | 141/1 |
| 5,273,088 | 12/1993 | Cripe | 141/329 |
| 5,322,093 | 6/1994 | O'Neil | 141/51 |

Primary Examiner—Ernest G. Cusick
Attorney, Agent, or Firm—Mark C. Jacobs

[57] ABSTRACT

A method for recovering propellant from used aerosol cans which includes the steps of piercing the can; removing the mixture of residual propellant and fluid product from the can; collecting the mixture and then separating the propellant from the residual fluid product.

6 Claims, 2 Drawing Sheets ized as a significant cause of lower atmospheric air pollution or smog. Therefore, in even moderately populated areas of the country severe restrictions have been placed on the use of such compounds in many operations.

In addition to the selection of a gas propellant, a further problem in the aerosol packaging industry resides in the disposing of the used aerosol containers, particularly for large scale commercial users. After the product has been used up, the container remains charged with the propellant, and where the propellant is a flammable gas, the container is considered hazardous waste, even where the product is a water-based liquid.

In disposing of flammable propellants a particular problem arises with sparks upon puncture which might lead to explosion.

In addition to the concerns of discharging propellants into the atmosphere, which is coming under closer governmental regulation, there is the issue of costs, both in lost propellant and lost product. This invention addresses these issues with a unique solution.

AEROSOL CAN RECYCLING SYSTEM

REFERENCE TO COPENDING APPLICATION

This application is a divisional of Ser. No. 07/758,793 filed Sep. 12, 1991, now U.S. Pat. No. 5,322,093.

SPECIFICATION

1. Field of the Invention

This invention relates generally to the field of spray can compaction and recycling of cans, spray propellants, and products.

2. Background of the Invention

Aerosol dispensers have been available for a number of years for application of hair sprays and other personal care products, as well as for paints, lubricants, insecticides and a multitude of other liquid products.

In the earlier days of aerosol marketing, "Freon" blends were widely used a propellants, principally because they were not flammable and were relatively nontoxic. However, in recent years, it was discovered that "Freons," when released into the atmosphere, migrated to the upper stratosphere and contributed to the depletion of ozone. Since ozone shields the surface of the earth against penetration of solar ultraviolet radiation, the use of "Freon" propellants was believed by many to have contributed to climate changes as well as to an increased incidence of skin cancers and cataracts. Accordingly, the U.S. Environmental Protection Agency (E.P.A.) banned the further use of "Freon" propellants. This forced aerosol packagers to select from alternative propellant systems, all of which had serious disadvantages, among which were various hydrocarbons, consisting of blends of propane and butane mixtures. However, such hydrocarbon propellants are extremely flammable, and are in the chemical class known as volatile organic compounds, which are recognized as a significant cause of lower atmospheric air pollution or smog. Therefore, in even moderately populated areas of the country severe restrictions have been placed on the use of such compounds in many operations.

OBJECTS OF THE INVENTION

A first object of the invention is efficient and safe recovery of propellant and product from aerosol containers.

A second object is recovering the propellant and product in a closed system in order to avoid discharge to the atmosphere.

A third object is to compact the aerosol container after it is evacuated in a single pass system to assure evacuation of contaminants and hazardous wastes.

A fourth object is an automated system capable of handling many containers in rapid succession.

SUMMARY OF THE INVENTION

An aerosol compaction apparatus comprising at least one piston for crushing an aerosol can, a sealed compaction chamber and a passage for gaseous can contents to escape the chamber.

A propellant recovery system, including a separation tank.

A source of combined liquid product and propellant aerosol, a compressor drawing from the headspace of the separation tank, and a propellant collection tank.

A method of recovering propellant from aerosol cans comprising the steps of piercing said cans, blowing gaseous contents of said cans into a separation tank, drawing gas from a headspace of said separation tank, and collecting said gas in a propellant collection tank.

DESCRIPTION OF PREFERRED EMBODIMENTS

Figure 1:
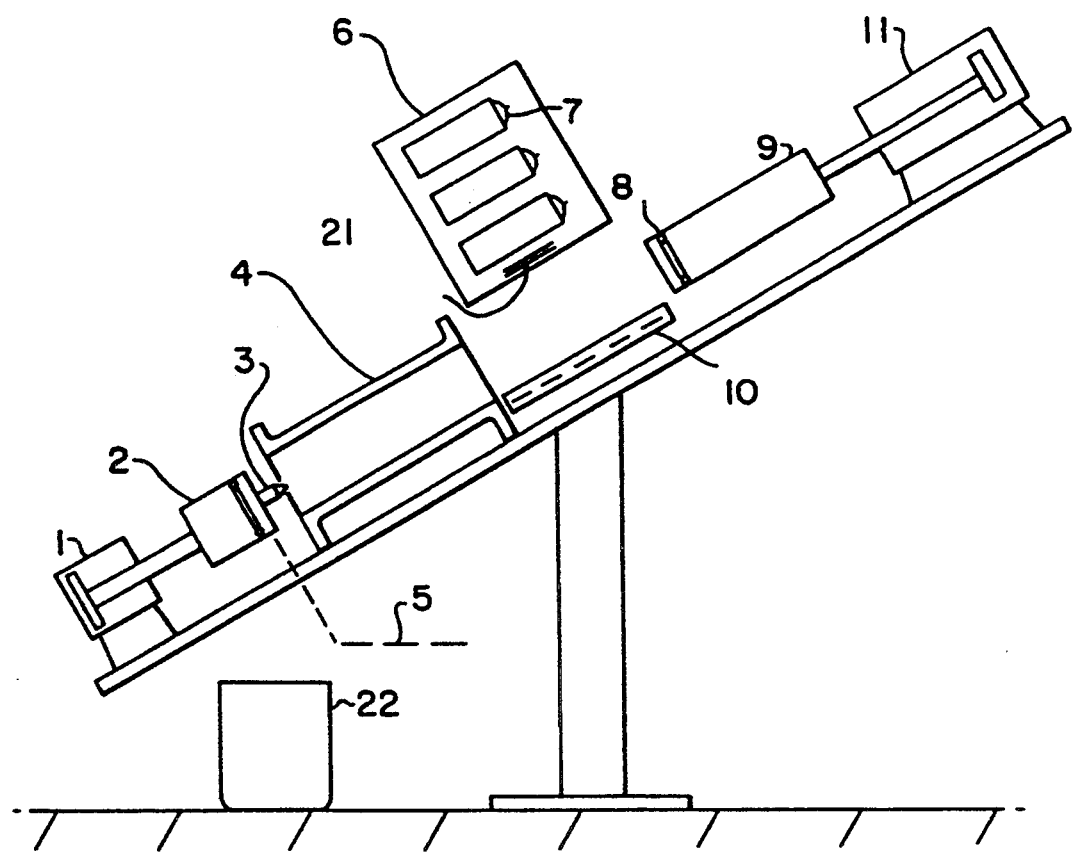
FIG. 1—A side view of a can compaction apparatus.
Figure 2:
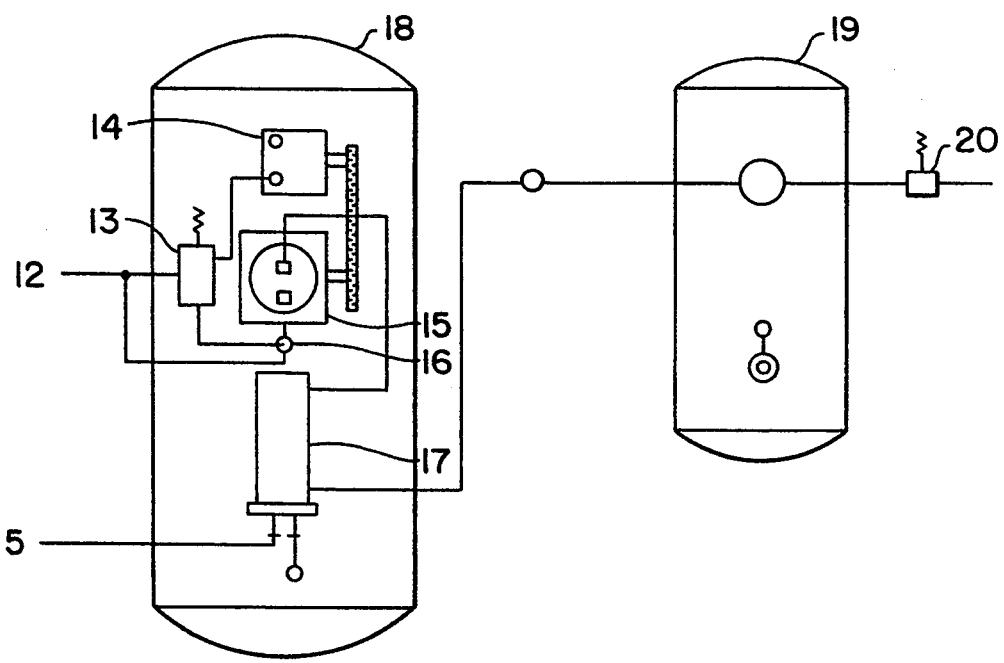
FIG. 2—A flow diagram of the recovery system.

The can compactor and the associated propellant recovery system are operated entirely by compressed air. Considering the flammable nature of the products being processed this affords a high measure of safety. The can compactor automatically receives aerosol cans 7 from can hopper 6. Feed finger 21 allows single can to drop onto feed chute 10. The slope of chute 10 allows can to slide downward into compaction cylinder 4. Piston 2 is normally advanced into cylinder 4. Compaction piston 9 advances downward by air cylinder 11 and enters cylinder 4 in a sealed connection.

The entrapped can is then forced into engagement with hollow penetrating needle 3. As the can 7 is progressively crushed by the advancing piston 9, the fluid and propellant contents of compacting can exit through needle 3 and line 5.

When a timed interval occurs coinciding with the complete compaction of can and evacuation of its content, piston 2 withdraws from cylinder 4 and allows compacted can slug to drop free into collection container 22.

A valve at the stroke terminus of cylinder 1 directs both cylinder 1 and cylinder 9 to retract to their respective home positions in readiness for the next can drop cycle.

PROPELLANT RECOVERY SYSTEM

The aerosol can contents exit the compactor through line 5 and enter a heat exchanger 17 before flowing into separation tank 18. The liquified propellant under a pressure only slightly above atmospheric pressure converts to a gas with a corresponding sharp drop in temperature. This cooling effect is used to advantage to cool the propellant that is subsequently compressed and reliquefied.

Within tank 18, the liquid products of the aerosol accumulate in the lower area of tank while the highly volatile propellant seek the headspace of the tank. A pilot operated pressure sensing valve 17 responds to the slight rise above atmospheric pressure resulting from the presence of the propellant. This results in a pressure signal opening valve 13 with a resultant air supply to air motor 14. Air motor 14 drives gas compressor 15 which is connected to tank 18 head space.

The propellant vapors are then compressed and introduced to heat exchanger 17 where the reduced temperature causes the compressed vapors to liquify and flow to propellant tank 19. Tank 19 is equipped with a pressure relief valve that is ideally set at 20 PSI to 30 PSI above the liquefication pressure of the propellant. The purpose of this relief valve function is to vent any air or other compressed gas from the propellant product stream. At the relief pressure setting, the propellant can only exist in liquid form and thus migrate under the influence of gravity away from elevated relief valve to lower region of tank 19.

Figure 3:
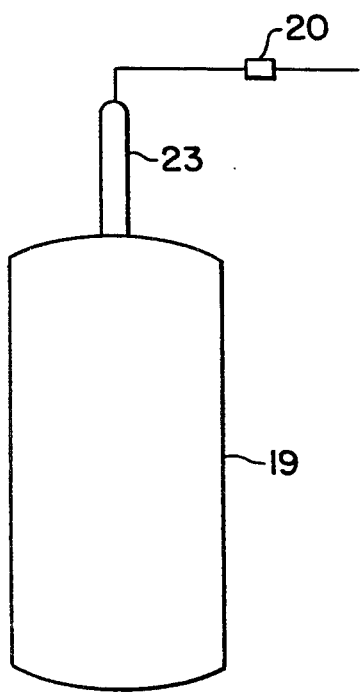
FIG. 3—A flow diagram of another embodiment of the propellant collection tank.

In an alternate embodiment, a condensation column 23 is mounted atop tank 19 to condense propellant into droplets which migrate under the influence of gravity to be recovered in the tank 19. In this embodiment, the pressure relief valve 20 is mounted atop the column 23 as shown in FIG. 3. The reliquefied propellant may be re-used in aerosol production or as a fuel source.

Obviously, many modifications and variations of the present invention are possible in light of the above teachings. It is therefore to be understood that within the scope of the intended claims the invention may be practiced other than as specifically described.

What is claimed and desired to be secured by Letters Patent of the United States:

1. A method of recovering propellant and residual product from aerosol cans comprising the steps of piercing said cans,
   flowing the gaseous contents of said cans into a separation tank having a head space,
   drawing gas from the headspace of said separation tank,
   cooling and compressing said gas drawn from separation tank,
   and collecting said now compressed gas in a propellant collection tank.

2. The process of claim 1 wherein the compressing step comprises liquefying the gas for collection in said propellant collection tank.

3. A method for recovering propellant from used aerosol cans of a fluid product which comprises:
   (a) piercing the bottom of an aerosol can;
   (b) withdrawing the mixture of residual propellant and fluid product from the aerosol can;
   (c) cooling the mixture of propellant and residual product in a separation tank, whereby fluid residual product accumulates in the lower part of the tank, while propellant which is volatile accumulates in the upper portion of the tank;
   (d) sensing the change of pressure within the tank;
   (e) liquefying the vapors of propellant; and
   (f) collecting the liquified propellant.

4. In the method of claim 3 wherein the liquefying step (e) comprises first compressing the vapors of propellant, and then introducing the compressed vapors into a heat exchanger to reduce the temperature and cause liquification.

5. In the method of claim 3 including the step of condensing the recovered propellant in a condensation column to form droplets, prior to ultimate collection.

6. A method for recovering propellant from used aerosol cans of a fluid product which comprises:
   (a) piercing the can;
   (b) removing the mixture of residual propellant and fluid product from the aerosol can;
   (c) placing the removed mixture from the aerosol can into a heat exchanger to lower the temperature of the mixture;
   (d) introducing and collecting the mixture in a separation tank;
   (e) separating the propellant from the residual fluid product;
   (f) collecting the propellant in a tank.

* * * * *